F. DOUGLAS.
STEAM TRAP.

No. 22,170. Patented Nov. 30, 1858.

UNITED STATES PATENT OFFICE.

FRANK DOUGLAS, OF EAST LIVERPOOL, OHIO.

STEAM-TRAP.

Specification of Letters Patent No. 22,170, dated November 30, 1858.

*To all whom it may concern:*

Be it known that I, FRANK DOUGLAS, of East Liverpool, in the county of Columbiana and State of Ohio, have invented a new and Improved Cylinder-Cock for Locomotive and other Steam Engines, which is also applicable as a steam-trap for general purposes; and I do hereby declare that the following is a full, clear, and exact description of the same, reference being had to the accompanying drawings, forming part of this specification, in which—

Figure 1:
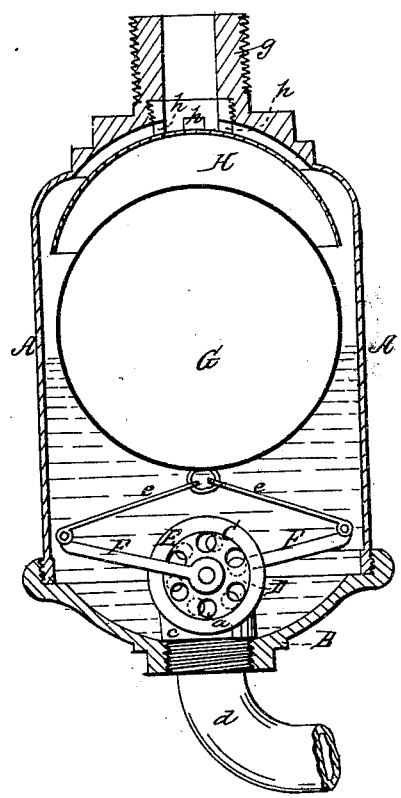
Figure 2:
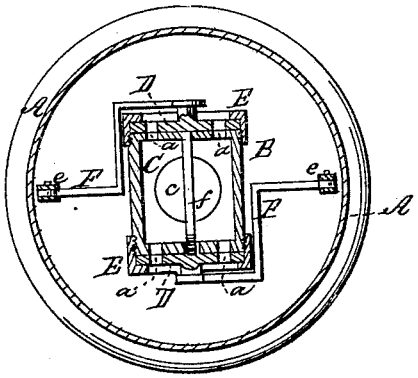

Figure 1, is a vertical section of the cock. Fig. 2, is a longitudinal section of the same.

Similar letters of reference indicate corresponding parts in both figures.

This invention consists in a certain mode of applying and arranging two disk valves and the connections of the same with a float to operate as hereinafter described; and it further consists in a guard applied as hereinafter described to protect the said float from the action of steam.

To enable others skilled in the art to make and use my invention, I will proceed to describe its construction and operation.

A, is an upright cylindrical box or casing having at its upper end a screwed nozzle *g*, which is to be screwed into the engine cylinder, in the place generally occupied by the cylinder cocks, or which serves to attach the cock to any apparatus to which it may be desired to apply it. The said casing has also a movable bottom B, which screws on.

C, is a horizontal cylindrical chamber whose ends are faced externally to constitute the seats for the two disk valves D, D, which are confined in place by two rings E, E, which screw on to the ends of the said chamber. The said chamber is provided with a screwed socket *c*, which screws into the center of the bottom B, of the box A, and to which is attached the escape pipe *d*. The valves and their seats have each a corresponding number of holes *a, a,* arranged in corresponding circles at equal distances apart. The valves have attached levers F, F, which are set in opposite directions and bent around the sides of the cylinder so that their ends are opposite each other, and which are connected by two rods *e, e,* with a float G.

*f*, is a central stem having one end screwed into one of the valves and having its other end bearing against the other valve. This stem is adjustable by its screw to keep the valves at the proper distance apart to work easily in contact with their seats and to prevent excessive friction being produced by their being pressed upon their seats by steam entering the casing. The levers F, F, are so arranged that when there is no water in the box A, and the float is resting on the chamber C the holes *a, a,* are all closed.

H, is a guard of spherical form corresponding with that of the float G, secured to the crown of the box A, to prevent steam which enters the box at the inlet opening in the nozzle from striking directly on the float and keeping it down. There are openings *h, h,* between the crown of this guard and the top of the box to admit steam or water through the nozzle *g*, into the box.

The operation is as follows. As the water of condensation enters the box by the openings *h, h,* and rises in the box, it raises the float G, and, by the action of the float on the levers F, F, causes the passages *a, a,* of the valves to open and permit the escape of the water from the box through the chamber C, socket *c*, and escape pipe *d*, raising the float higher and giving more opening, as the amount of condensation increases, but permitting the float to descend and gradually close the passages *a, a,* as the amount of condensation diminishes, until, as the condensation ceases, the valves are closed and the escape of steam prevented. The connection of the rods *e, e,* with the float is by eye joints, which leave the float very free to operate and yet keep it free from the side of the box; and the float, owing to the considerable length of the levers F, F, acts with great force upon the valves, both as it rises and as it falls.

As a cylinder cock for locomotives this apparatus possesses particular advantages for the reason that it is not liable to become deranged by the jarring of the locomotive.

I do not claim the combination of a valve or valves with a float, to act as a steam trap, or for any purpose where the escape of water is to be provided for but the escape of steam prevented. But What what I claim as my invention and desire to secure by Letters Patent, is—

1. The arrangement, within the box A, of the horizontal cylindrical chamber C, the two disk valves E, E, with their interposed adjustable stem $f$, the levers F, F, and connections of said levers with the float, substantially as herein set forth.

2. The spherical float-guard H, applied within the box A, and in relation to the inlet passages $h$, $h$, substantially as and for the purpose herein set forth.

FRANK DOUGLAS.

Witnesses:
SANFORD C. HILL,
WILLIAM PRICE.